United States Patent
Alavi et al.

(10) Patent No.: US 11,841,106 B2
(45) Date of Patent: Dec. 12, 2023

(54) FORMALDEHYDE FREE COMPOSITES MADE WITH CARBOHYDRATE AND ALPHA-CARBON NUCLEOPHILE BINDER COMPOSITIONS

(71) Applicant: JOHNS MANVILLE, Denver, CO (US)

(72) Inventors: Kiarash Alavi, Littleton, CO (US); Ameya Natu, Littleton, CO (US)

(73) Assignee: Johns Manville, Denver, CO (US)

( * ) Notice: Subject to any disclaimer, the term of this patent is extended or adjusted under 35 U.S.C. 154(b) by 120 days.

(21) Appl. No.: 15/134,878

(22) Filed: Apr. 21, 2016

(65) Prior Publication Data

US 2016/0312941 A1    Oct. 27, 2016

Related U.S. Application Data

(63) Continuation-in-part of application No. 14/692,580, filed on Apr. 21, 2015.

(51) Int. Cl.
*F16L 59/02* (2006.01)
*D06M 15/11* (2006.01)
(Continued)

(52) U.S. Cl.
CPC ............. *F16L 59/028* (2013.01); *C08J 5/04* (2013.01); *C08J 5/10* (2013.01); *C09J 103/02* (2013.01);
(Continued)

(58) Field of Classification Search
CPC ........ C08G 12/00; C08G 14/00; C08G 16/00; C08H 99/00; C08K 5/0025; C08K 7/02; C08K 7/14; D04H 1/587; Y10T 428/253; Y10T 428/2933; Y10T 442/20; Y10T 442/2992; C08J 2303/02; C08J 2305/00;
(Continued)

(56) References Cited

U.S. PATENT DOCUMENTS 4,537,634 A * 8/1985 Floyd .................... D21H 19/46
428/533
8,372,900 B2   2/2013 Shooshtari et al.
(Continued)

FOREIGN PATENT DOCUMENTS

WO   WO-2013150123 A1 * 10/2013   ............... C07H 5/04

OTHER PUBLICATIONS

Jerry March, Advanced Organic Chemistry—Reaction, Mechanisms, and Structure; pp. 937-963, Fourth Edition, John Wiley & Sons, Jul. 1992.
(Continued)

*Primary Examiner* — Shuangyi Abu Ali
(74) *Attorney, Agent, or Firm* — Robert D. Touslee

(57) ABSTRACT

Fiber-containing composites are described that contain woven or non-woven fibers, and a cured binder formed from a binder composition that includes (1) a reducing sugar and (2) a crosslinking agent that includes a first carbon moiety selected from an aldehyde, a ketone, a nitrile, and a nitro group, wherein an α-carbon atom having at least one acidic hydrogen is directly bonded to the first carbon moiety. Exemplary reducing sugars include dextrose and exemplary crosslinking agents include glyoxal. Exemplary fiber-containing composites may include fiberglass insulation.

31 Claims, 4 Drawing Sheets

(51) Int. Cl.
*C09J 103/02* (2006.01)
*C08J 5/10* (2006.01)
*D06M 15/03* (2006.01)
*D04H 1/587* (2012.01)
*C08J 5/04* (2006.01)

(52) U.S. Cl.
CPC ............ *D04H 1/587* (2013.01); *D06M 15/03* (2013.01); *D06M 15/11* (2013.01); *C08J 2303/02* (2013.01); *C08J 2305/00* (2013.01); *C08J 2305/02* (2013.01); *C08J 2403/02* (2013.01)

(58) Field of Classification Search
CPC ...... C08J 2305/02; C08J 2403/02; C08J 5/04; C08J 5/10; C09J 103/02; D06M 15/03; D06M 15/11; D06M 15/333; D06N 2201/082; D06N 2203/024; D06N 2203/028; D06N 3/0006; D06N 3/0011; F16L 59/028
See application file for complete search history.

(56) References Cited

U.S. PATENT DOCUMENTS

| | | |
|---|---|---|
| 2011/0039111 A1 | 2/2011 | Shooshtari |
| 2012/0156954 A1* | 6/2012 | Eckert .................. C03C 25/321 442/180 |
| 2013/0032749 A1* | 2/2013 | Jaffrennou ............. C09J 103/02 252/62 |
| 2013/0047888 A1* | 2/2013 | Mueller ................ C08G 16/00 106/163.01 |
| 2013/0140481 A1* | 6/2013 | Naerum .................. C03C 25/26 252/62 |
| 2013/0327250 A1* | 12/2013 | Shooshtari ............. C09J 161/24 106/217.5 |
| 2014/0027662 A1* | 1/2014 | Shooshtari ............. C08L 61/02 252/62 |

OTHER PUBLICATIONS

Francis A. Carey and Richard J. Sundberg, Advanced Organic Chemistry—Part B: Reactions and Synthesis; pp. 55-75, Third Edition, Plenum Press, Jan. 1990.
T.W.Graham Solomons, Organic Chemistry, pp. 791-802, Fourth Edition, John Wiley & Sons, Apr. 1988.

* cited by examiner

FORMALDEHYDE FREE COMPOSITES MADE WITH CARBOHYDRATE AND ALPHA-CARBON NUCLEOPHILE BINDER COMPOSITIONS

CROSS-REFERENCES TO RELATED APPLICATIONS

This application is a continuation-in-part of pending U.S. patent application Ser. No. 14/692,580, filed Apr. 21, 2015, entitled "FORMALDEHYDE FREE COMPOSITES MADE WITH CARBOHYDRATE AND ALPHA-CARBON NUCLEOPHILE BINDER COMPOSITIONS, (the "parent application") which is incorporated herein by reference for all purposes.

BACKGROUND OF THE INVENTION

Organic binders for composite fiber products such as fiberglass insulation are moving away from traditional formaldehyde-based compositions. Formaldehyde is considered a probable human carcinogen, as well as an irritant and allergen, and its use is increasingly restricted in building products, textiles, upholstery, and other materials. In response, binder compositions have been developed that reduce or eliminate formaldehyde.

One type of these formaldehyde-free binder compositions rely on esterification reactions between carboxylic acid groups in polycarboxy polymers and hydroxyl groups in alcohols. Water is the main byproduct of these covalently crosslinked esters, which makes these binders more environmentally benign, as compared to traditional formaldehyde-based binders. However, these formaldehyde-free binder compositions also make extensive use of non-renewable, petroleum-based ingredients. Thus, there is a need for formaldehyde-free binder compositions that rely less on petroleum based ingredient.

As an abundant and renewable material, carbohydrates have great potential to be an alternative to petroleum-based binders. Carbohydrates derived from plants are already made in industrial-scale quantities from renewable agricultural processes. Carbohydrates of the reducing sugar variety (e.g dextrose, fructose, etc.) have been reacted with nitrogen-containing crosslinking agents to make Maillard-type thermoset binders for building materials such as fiberglass insulation. In some instances, the nitrogen-containing crosslinking agent is an ammonium salt of a polycarboxylic acid, such as citric acid. The ammonium ions [$NH_4^+$] provide the nitrogen source that react with the carbonyl carbon on the reducing sugar while the carboxylate ions form crosslinking bonds with the hydroxyl groups and other moieties on the polymerizing reducing sugars. In products where the mechanical and aging properties of the finished material are less stringent, the more complex and expensive organic anions can be substituted with less expensive inorganic ammonium salts (e.g. ammonium phosphate, ammonium sulfate, etc.).

Unfortunately, many types of Maillard-type binders tend to become brittle when cured and form excessive particulates when the insulation is folded or compressed. Some Maillard-type binders are also prone to accelerated degradation in humid environments and thus require additional conditioning and additives to improve their moisture/water resistance. Thus, there is a need to improve the stability, water resistance, and other properties of binder compositions that substitute carbohydrates for petroleum-based reactants in binder compositions for composite materials. These and other issues are addressed in the present application.

BRIEF SUMMARY OF THE INVENTION

Fiber-containing composites are described that reduce or eliminate a Maillard reaction from carbohydrate-containing binder compositions. This is accomplished by replacing the conventional nitrogen nucleophile in Maillard-type binder compositions with an α-carbon nucleophile that reacts with the carbonyl carbon on a reducing sugar carbohydrate. The α-carbon crosslinking agent produces fiber-containing composites with improved mechanical properties, aging characteristics, and costs.

The α-carbon crosslinking agents may include compounds having an α-carbon that is polar covalently bonded to an adjacent carbon that is made partially electropositive by bonding to an electron withdrawing group such as oxygen or nitrogen functional group. One example of the electropositive adjacent carbon atom is a carbonyl carbon bonded to the α-carbon. Additional examples include nitrile and/or nitro group carbons bonded adjacent to the α-carbon. In all these instances, the α-carbon can loose an α-proton to become nucleophilic and reactive towards a carbonyl carbon on a nearby reducing sugar to initiate the formation of a crosslinked thermoset binder.

Exemplary fiber-containing composites may be made by applying the present binder compositions to a group of fibers and forming a pre-cured amalgam of the binder composition and fibers. The amalgam may then be exposed to curing conditions (e.g. dehydration, heating) to facilitate the curing of the binder and formation of a fiber-containing composite. During the curing stage, the crosslinking agent crosslinks with reducing sugars to form a polymeric matrix that adheres the fibers together in the fiber-containing composite. Examples of these composites include fiber insulation (e.g., fiberglass insulation) for piping, ducts, buildings, and other construction applications.

Embodiments include fiber-containing composites that include woven and/or non-woven fibers and a cured binder. The cured binder is formed from a binder composition that includes a carbohydrate and a crosslinking agent. The crosslinking agent may be an organic compound that includes a first carbon moiety and an α-carbon that is directly bonded to the first carbon moiety. The first carbon moiety and the α-carbon may be chosen from one or more of an aldehyde, a ketone, a nitrile, and a nitro group, among other types of electrophilic moieties.

The α-carbon has at least one acidic hydrogen atom that can dissociate from the α-carbon as a proton ($H^+$) to leave behind a reactive α-carbon nucleophile that reacts with a carbonyl carbon on the carbohydrate during the polymerization of the binder composition. The reaction of α-carbon nucleophiles and carbonyl carbons on the carbohydrates forms the cured binder.

Embodiments of the invention may also include methods of making a fiber-containing composite. The methods may include the steps of providing a plurality of woven and/or non-woven fibers, and applying a binder composition to the plurality of woven or non-woven fibers to make a binder-fiber amalgam. The binder-fiber amalgam may be cured to make the fiber-containing composite.

The binder composition used in the above-described methods may include a carbohydrate and a crosslinking agent (and/or crosslinking precursor). The crosslinking agent may be an organic compound that includes a first carbon moiety and an α-carbon that is directly bonded to the first carbon moiety. The first carbon moiety on the α-carbon may be chosen from one or more of an aldehyde, a ketone, a nitrile, and a nitro group, among other types of electrophilic moieties. The α-carbon has at least one acidic hydrogen atom that can dissociate from the α-carbon as a proton (H+) to leave behind a reactive α-carbon nucleophile that reacts with a carbonyl carbon on the carbohydrate during the polymerization of the binder composition. The reaction of α-carbon nucleophiles and carbonyl carbons on the carbohydrates forms the cured binder.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1A:
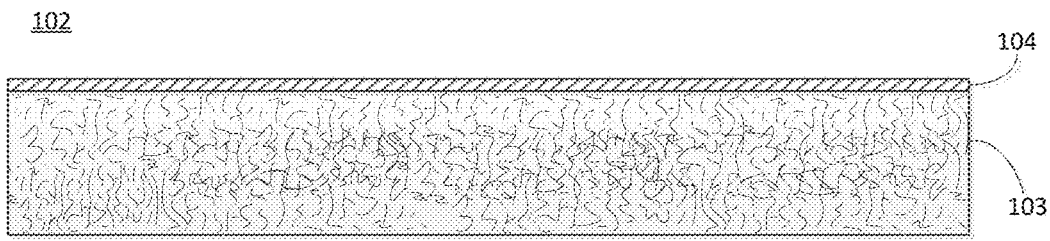
FIGS. 1A-C show simplified illustrations of exemplary composite materials according to embodiments of the invention.

The present binders include renewable materials such as carbohydrates (e.g. dextrose, fructose, etc.) crosslinked by an α-carbon-containing crosslinking agent. The α-carbon on the crosslinking agent has at least one acidic hydrogen atom (a.k.a. "active" hydrogen atom) that can dissociate from the α-carbon as a proton (H+) to leave behind a highly reactive, activated crosslinking agent. In many instances, the activated crosslinking agent has α-carbon nucleophile that reacts with a carbonyl carbon on a nearby carbohydrate to initiate the curing of the binder composition. In additional instances, an α-carbon nucleophile is formed in the reaction product of the activated crosslinking agent and the carbohydrate, which may go on to further reactions during binder curing. The curing may proceed through a series of addition and condensation reactions (among other reaction types) until the cured carbohydrate binder is finally formed.

In the present application, an α-carbon refers to an carbon atom directly bonded to an adjacent carbon atom which is bonded to an electron withdrawing group ("EWG"). For example, when the EWG is a double bonded oxygen (O=) bonded to a carbonyl carbon, an α-carbon is an adjacent carbon atom directly bonded to the carbonyl carbon. If the carbonyl carbon is part of an aldehyde functional group, then there is only one α-carbon bonded adjacent to the carbonyl carbon. However, if the carbonyl carbon is part of a ketone functional group, then there are two α-carbons bonded directly to the carbonyl carbon.

In some examples of the present crosslinking agents, an α-carbon may also be directly bonded to an EWG, or some other moiety besides hydrogen and/or carbon. For example, the when the crosslinking agent is glyoxal, there are aldehyde functional groups directly bonded at the carbon atoms as shown in chemical structure (I):

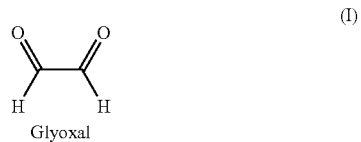

Glyoxal

Each of the carbon atoms in glyoxal is an α-carbon that is also a carbonyl carbon. The glyoxal carbons get their α-carbon character by being bonded to an acidic α-hydrogen that undergo proton dissociation to leave behind an activated crosslinking agent. Thus, glyoxal provides an example of a crosslinking agent having an α-carbon (more precisely two α-carbons) that is directly bonded to an EWG. Additional description of the present crosslinking agents is provided below.

Crosslinking Agents

As noted above, the present crosslinking agents are organic compounds that have a first carbon moiety bonded to both an electron withdrawing group ("EWG") and at least one α-carbon that has at least one acidic hydrogen (which may also be referred to as a α-hydrogen or an active hydrogen). When the acidic hydrogen deprotonates from the crosslinking agent, a highly reactive α-carbon nucleophile may form. Structure (IIa) shows a generic crosslinking agent having an α-carbon ($C_α$) adjacent to a carbon ($C_1$) bonded to an EWG. The α-carbon shown in structure (IIa) is bonded to at least one acidic hydrogen ($H_α$) that can deprotonate from the crosslinking agent. Structures (IIb) and (IIc) show two forms of the α-carbon nucleophile that depend on whether the binder curing is base-catalyzed (IIb) or acid-catalyzed (IIc). The base-catalyzed α-carbon nucleophile (IIb) simply requires a base (e.g. a hydroxyl group) to facilitate the deprotonation of the α-carbon to form a α-carbanion nucleophile. The acid-catalyzed nucleophile (IIc) facilitates the formation of a carbocation at $C_1$ which in turn facilitates the deprotonation of the α-hydrogen ($H_α$) and formation of a double bond between the $C_α$ and $C_1$ carbons. The C=C group acts as a nucleophile for nucleophilic addition with nearby carbonyl carbons on the carbohydrates, and is referred to here as an α-carbon nucleophile.

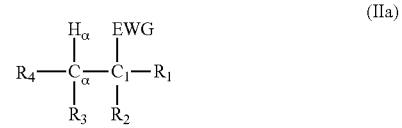

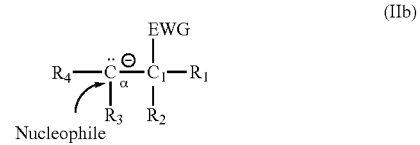

Nucleophile

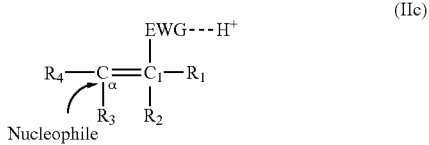

Nucleophile (IIc)

Examples of the EWG in structures (IIa)-(IIc) may include a double bonded oxygen atom (O=) that forms a carbonyl group with the adjacent carbon atom $C_1$. In additional examples, the EWG may be a nitrile group (N≡C—), a nitro group ($O_2N$—), a halogen group (e.g. (F—), (Cl—), (Br—), (I—)); or an oxyhalogen group, among other types of EWGs. The $C_1$ carbon is covalently bonded to at least one adjacent α-carbon ($C_\alpha$) that is bonded to at least one acidic α-hydrogen ($H_\alpha$).

The $R_1$ and $R_2$ may independently be a hydrogen, an alkyl group, an aromatic group, a hydroxyl group, or an alkoxy group, among other groups. When the EWG is a double bonded oxygen atom (O=), then either $R_1$ or $R_2$ are not present to maintain the quadravalency of the $C_1$ carbon. For example, $R_1$ may be a hydrogen atom and $R_2$ is not present to make the $C_1$ moiety an aldehyde group. Alternatively, $R_1$ may be an alkyl group (e.g. methyl group) and $R_2$ is not present to make the $C_1$ moiety a ketone group. Structure (IId) shows a generic crosslinker with an aldehyde group, and structure (IIe) shows a generic crosslinker with a ketone group.

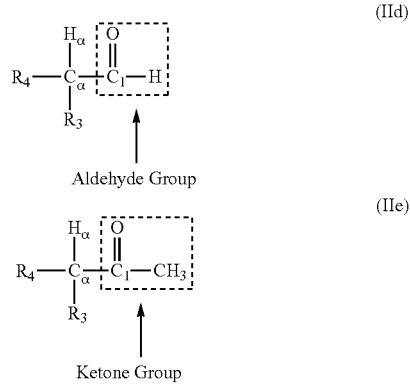

In additional examples where the EWG is a double bonded oxygen (O=), either the $R_1$ or $R_2$ group may be a hydroxyl group (HO—) or an alkoxy group (RO—). When the $R_1$ or $R_2$ group is a hydroxyl group (HO—) the $C_1$ moiety is an organic acid group, and when the $R_1$ or $R_2$ group is an alkoxy group (RO—) the $C_1$ moiety is an ester group.

The $R_3$ and $R_4$ groups bonded to the α-carbon ($C_\alpha$) may be a hydrogen, or a hydrocarbon group such as a substituted or unsubstituted alkyl group, aromatic group, or olefinic group, among other hydrocarbon groups. When the $R_3$, and/or $R_4$ groups are hydrogen, then the α-carbon ($C_\alpha$) has multiple acidic α-hydrogens.

As noted above in the discussion of glyoxal, examples of crosslinking agents can also have an electron withdrawing group as the $R_3$, and/or $R_4$ group. For glyoxal, $R_3$ or $R_4$ is a double bonded oxygen moiety like the EWG bonded to $C_1$. In this situation both $C_\alpha$ and $C_1$ act as α-carbons, each bonded to an acidic hydrogen that can dissociate to form an activated crosslinking agent.

When an α-carbon on the crosslinking agent is bonded to more than one acidic hydrogen, it may crosslink an equivalent number of carbohydrate molecules to the α-carbon. Reaction scheme (III) below, for example, shows an EWG, such as a carbonyl carbon of an aldehyde or ketone, bonded to an α-carbon with multiple acidic hydrogens. As the first hydrogen dissociates from the α-carbon it becomes an α-carbon nucleophile that attacks the carbonyl carbon on a nearby carbohydrate, shown here as dextrose. The reaction product has the α-carbon bonded to the first dextrose unit, but also bonded to a second hydrogen that continues to be acidic due to the electrophilic character of the adjacent carbon bonded to the EWG. When the second hydrogen dissociates from the α-carbon nucleophile it again becomes an α-carbon nucleophile capable of reacting with a second carbonyl carbon on a second nearby dextrose unit. Thus, a single α-carbon on the crosslinking agent can crosslink two carbohydrate molecules:

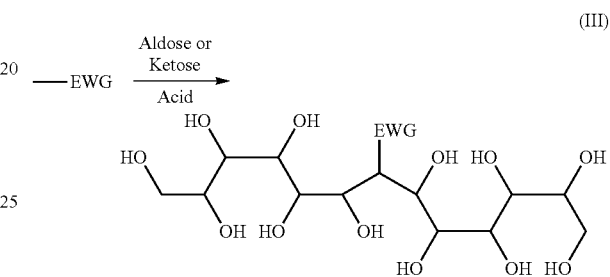

In reaction scheme (III) the α-carbon addition reaction to the dextrose units is catalyzed by an acid catalyst. Catalytic protons first combine with the EWG to form a cation that eventually forms the α-carbon nucleophile through acid-catalyzed tautomerization. Alternatively, the α-carbon nucleophile may be formed from a based-catalyzed dissociation of an acidic α-hydrogen directly from the α-carbon. Exemplary acid and base catalysts are described below.

In reaction scheme (III) the crosslinking agent had a single EWG. Reaction scheme (IV) below uses glyoxal in the binder composition and shows an example of a crosslinking agent with two EWGs which also happen to be bonded to the α-carbons. While not wishing to be bound to a particular reaction mechanism, it is believed the binder curing scheme for glyoxal and dextrose starts with an acid-catalyzed activation of the glyoxal to remove an acidic proton from one of the α-carbons. The activated glyoxal then reacts with the carbonyl carbon on the dextrose to make a reaction product with a new α-carbon attached to a hydroxyl group formed from the carbonyl oxygen of the dextrose. Under the acid catalysis conditions of the binder composition, the hydroxyl group leaves to form a water molecule and the carbocation left behind on the reaction product undergoes a tautomerizaton with an adjacent hydroxyl group to form the new α-carbon and another carbonyl group. The new α-carbon can react with another nearby dextrose carbonyl group to extend the growing glyoxal-dextrose polymer.

As shown in reaction scheme (IVa), the glyoxal moiety on the glyoxal/dextrose reaction product still has a second α-carbon available for reactions. In one possible scenario the α-carbon can react with a carbonyl carbon on another dextrose molecule to further grow the glyoxal-dextrose polymer through a series of addition and condensation reactions like those shown in reaction scheme (IVa). It should be appreciated that a wide variety of growth pathways are available for the continued polymerization of the glyoxal and dextrose binder composition as it forms the cured, thermoset binder. Reaction scheme (IVa) is a simplified rendering of one of those possible pathways.

(IVa)

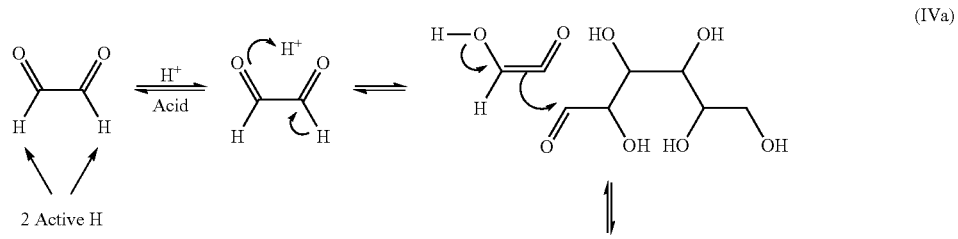

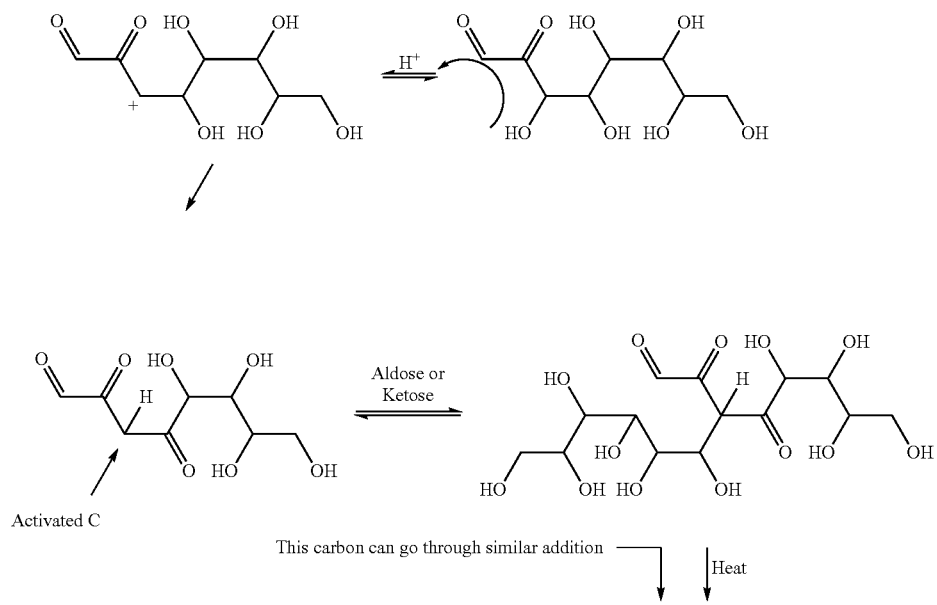

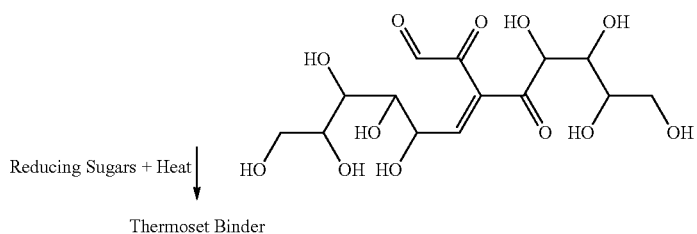

Reaction scheme (IVb) shows two possible pathways (Path 1 and 2) for continued reactions of the glyoxal-dextrose composition. Path 1 shows an internal condensation reaction between a carbonyl oxygen and hydroxyl group to form a heterocyclic furfuryl alcohol ring that can undergo further crosslinking reactions. Path 2 shows another internal condensation reaction that forms a heterocyclic lactone alcohol ring also capable of further crosslinking reactions:

(IVb)

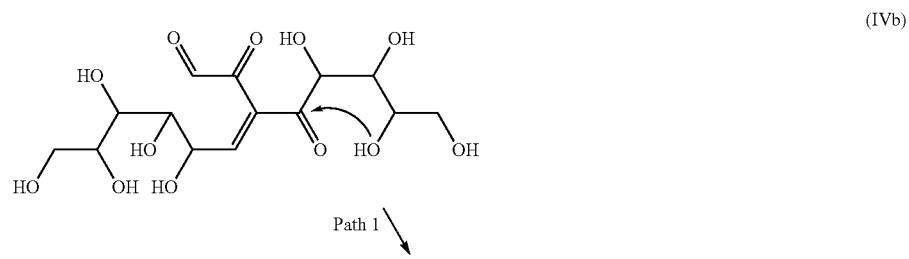

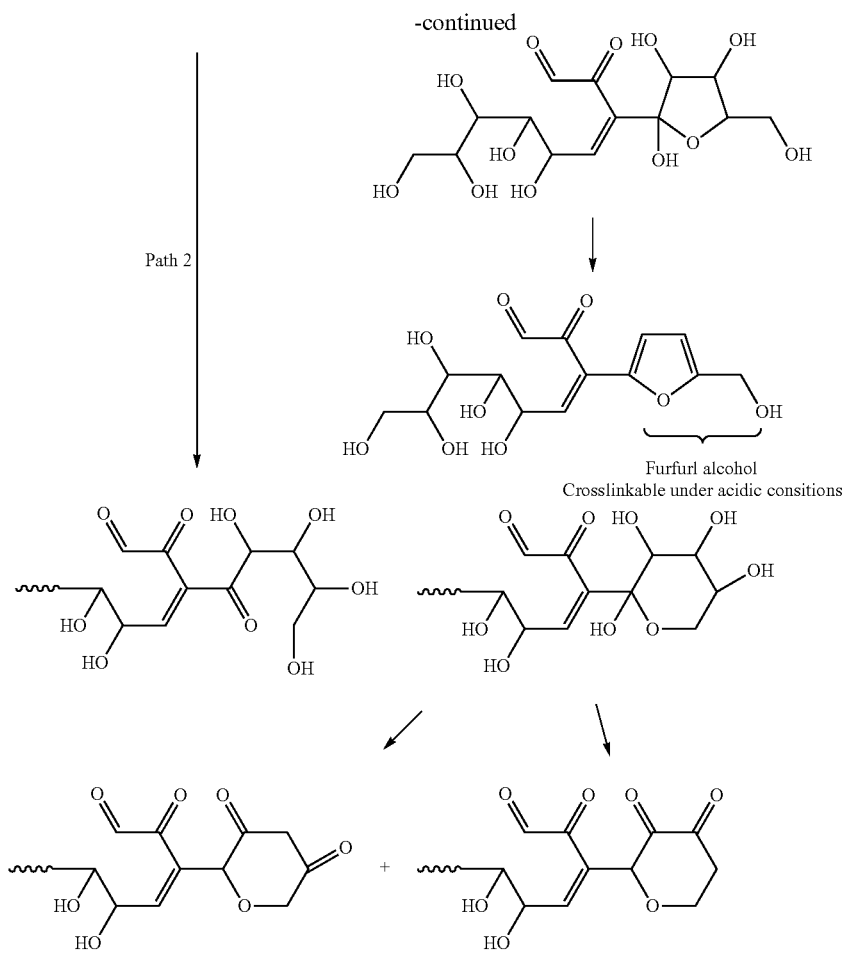

Path 2

Furfurl alcohol
Crosslinkable under acidic consitions

The products shown in both pathways are able to further react with additional dextrose molecules and/or other glyoxal-dextrose reaction products to further the polymerization of these products as the binder cure continues. The reaction of the α-carbon nucleophile of a glyoxal/dextrose reaction product and another carbonyl carbon on a second dextrose molecule is called an aldol addition reaction. An aldol addition normally retains the carbonyl carbon from the nucleophile (in this case the crosslinking agent) and forms a hydroxyl group at a β-carbon position two carbon atoms away from the carbonyl carbon. It is common for the aldol addition product to subsequently undergo an aldol condensation that removes a proton from the α-carbon and the hydroxyl group from the β-carbon to leave an olefinic condensation product. In some instances the aldol condensation may be the final step in the polymerization of the carbohydrates and crosslinking agents, while at other times the condensation occurs before the final polymerization stage.

It should be appreciated that the pathways shown in reaction scheme (IVb) are just two of a larger group of possible pathways for the polymerization of the glyoxal and dextrose to form the cured, thermoset binder. All of these pathways reflect the fact that glyoxal has two α-carbons that can each react with the carbonyl carbon on dextrose molecules to produce polymer intermediates that can form additional α-carbons for reaction with still more dextrose molecules. As these intermediates grow in size and complexity, more internal condensation reactions occur until eventually the final cured thermoset binder is formed.

The glyoxal crosslinking agent described above is just one example of a larger class of crosslinking agents having a plurality of aldehyde and/or ketone functional groups. This larger class includes polyaldehydes (e.g. dialdehydes), polyketones (e.g. diketones), and compounds that have at least one aldehyde group and at least one ketone group. Examples include α,β-bicarbonyl compounds where carbonyl carbons are directly bonded as illustrated in the following generic structure (V):

(V)

where $R_5$ and $R_6$ are independently chosen from a hydrogen moiety (H), an alkyl group, or an aromatic group. Exemplary α,β-carbonyl compounds include gloxyal, diacetyl, and benzil 1,2-diphenylethane-1,2-dione).

Examples further include α,γ-bicarbonyl compounds where the carbonyl carbons are separated by one carbon atom as illustrated in the following generic structure (VI):

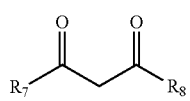

(VI)

wherein $R_7$ and $R_8$ are independently chosen from a hydrogen moiety (H), an alkyl group, or an aromatic group. Exemplary α,γ-bicarbonyl compounds include malondialdehyde, 1,3-propanedial, and acetylacetone, among others. In additional examples, more carbons may separate the two carbonyl groups. These include crosslinking agents having the general formula $R_7(O{=}C){-}(CH_2)_x{-}(C{=}O)R_8$, where x is an integer ranging from 2 to 8. Examples of the these crosslinking agents include dialdehydes such as 1,4-butanedial, glutaraldehyde, 1,5-pentanedial, 1,6-hexanedial, etc. When $R_7$ and/or $R_8$ is an alkyl group, they also include aldehyde-ketone compounds and diketones. Examples of these crosslinking agents include 2,3-butanedione, 2,4-pentanedione (a.k.a. acetylacetone), and quinones, among others.

In some instances, the $R_7$ and $R_8$ groups may independently also include alkoxide groups (—OR) where R represents an alkyl group. For example, the α,γ-bicarbonyl compounds may include malonic acid esters having generic structure (VII):

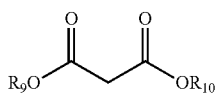

(VII)

where $R_9$ and $R_{10}$ are independently an alkyl group or an aromatic group.

Additional examples of α,γ-bicarbonyl compounds may further include those with alkoxy moieties such as those illustrated in generic structure (VIII):

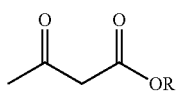

(VIII)

where R represents an alkyl group.

While many of the carbonyl-containing crosslinking agents above have two or more carbonyl groups, crosslinking agents with a single carbonyl group may also used in the present binder compositions. These may include aldehydes and ketones, esters, and organic acids. Exemplary aldehydes include ethanal, propanal, etc. Exemplary ketones include, acetone, and methyl ethyl ketone (MEK), among others.

As noted above, carbonyl-containing EWGs may also include esters and organic acids having one or more of these functional groups. Exemplary esters include dialkyl malonates, alkyl acetates, polyesters, polyacrylates, acetoacetate esters, and cyano-acetate esters. Exemplary organic acids may include acetic acid, propionic acid, malonic acid, and polyacrylic acid, among other types of acids. They may also include crosslinking agents with mixed functional groups, such as cyano-acetic acid.

As noted above, EWGs other than a double bonded oxygen atom (O=) to form a carbonyl carbon may be used in the present binder composition. For example nitrogen-containing EWGs such as a nitrile group (N≡C—), or a nitro group ($O_2N$—) may be the EWG bonded to the carbon adjacent to the α-carbon. These nitrogen-containing EWGs are electrophilic in character and therefore do not participate as nitrogen nucleophiles in Maillard reactions with the carbohydrates. Thus, even though the binder composition (and the cured binder of the present fiber-containing composite) may include certain nitrogen-containing compounds, these compounds do not undergo Maillard reactions to any appreciable extent, and the cured binder does not contain significant (or any) amount of melanoidins.

The instant new and inventive binder composition to be cured does not contain any urea and/or compounds having a primary or secondary amine or ammonium group or compounds forming urea and/or compounds having a primary or secondary amine or/ammonium group during curing of the binder composition as part of the crosslinking agent or as further component of the binder composition. Tertiary amines may be present, because they are not participating in the Maillard reaction. Thus the cured binder of the present fiber-containing composite does not contain any melanoidins formed from said binder composition. To such extent base catalysts are used as catalyst and such basic catalyst include alkaline nitrogen compounds and/or amines, minor amounts of melanoidins can be formed. However, such melanoidins are only formed from such basic catalyst and are considered not being significant. Thus, the instant new and inventive binder composition after curing does not contain significant (or any) amount of melanoidins. The term significant within the meaning of the aforementioned refers to the instant new and inventive binder composition after curing having not more than 3 wt. %, preferable not more 1 wt. % of melanoidins, based on the total amount of cured binder being present.

Exemplary crosslinking agents having a nitrogen group include nitrile compounds such as acetonitrile, propionitrile, butyronitrile, pentanenitrile, hexanenitrile, and higher nitriles, among other nitrile compounds. They also include polynitriles such as 1,3-dinitriles, malonitrile (methan-dinitrile), adiponitrile, hexanedinitrile, polyacrylonitrile, and acrylonitrile compolymers, among other polynitrile compounds. They further include nitro compounds such as nitromethane, nitroethane, nitropropane, nitrobutane, nitropentane, nitrohexane, among other nitroalkyl compounds. They still further include 1,3-cyano-esters, cyano-acetic acid, and cyano-acetic esters, among other cyano compounds.

Exemplary crosslinking agents may also include sulfur-containing EWGs. These exemplary sulfur-containing crosslinking agents may include a sulfoxide functional group, or sulfone functional groups, among other types of sulfur-containing groups. Specific examples of these exemplary crosslinking agents include dimethyl sulfoxide (DMSO) and dimethyl sulfone. Crosslinking agents with phosphorous-containing EWG may also be used. These exemplary crosslinking agents may include phosphoxide functional groups such as alkyl phosphoxides (e.g. trimethyl phosphoxide).

Exemplary concentration ranges (by dry weight) of the crosslinking agent in the binder composition may include about 1 wt. % to about 50 wt. %. More specific ranges include about 5 wt. % to about 25 wt. %; and about 10 wt. % to about 20 wt. %, among others. Specific exemplary concentrations (by dry weight) for the crosslinking agent in the binder composition include about 5 wt. %, about 10 wt. %, about 15 wt. %, about 20 wt. %, and about 25 wt. %, among other concentrations.

Carbohydrate Reactants

The carbohydrate used in the binder composition may be a reducing sugar having an aldehyde or ketone group that is capable of isomerizing to produce an aldehyde group. Exemplary reducing sugars include monosaccharaides such as glucoses (e.g. dextrose), fructose, glyceraldehyde, and galactose. They also include polysaccharides such as lactose, maltose, xylose, and amylose, among others. The binder compositions may include a single reducing sugar or a combination of two or more reducing sugars as the reducing sugars in the composition.

The carbohydrates may also include larger polysaccharides (e.g. hydrolysable polysaccharides) such as starches, modified starches, celluloses, modified celluloses, and dextrins (e.g. cyclodextrins and maltodextrins). For the larger polysaccharides that are non-reducing because they lack an accessible aldehyde or ketone group, reducing sugars may be generated in situ under the elevated temperatures of the curing binder composition. For example, dextrin may hydrolyze in situ under curing conditions to provide one or more dextrose molecules that react with the crosslinking agent. Alternatively, the binder composition carbohydrate may include exclusively reducing sugars, or exclude one or more type of non-reducing carbohydrate. For example, the binder composition may lack one or more of starch, modified starch, cellulose, modified cellulose, and dextrin.

The molar ratio of the (1) crosslinking agent to (2) the reducing sugar generally ranges from 1:2 to 1:50. Exemplary ratios of crosslinking agent to reducing sugar include a range from 1:4 to 1:10. The tensile strength of the composites typically peak at 4 to 8 moles of dextrose normalized for 1 mole of the crosslinking agent. This translates into a peak tensile strength at (crosslinking agent):(reducing sugar) mole ratios between 1:4 and 1:8. The tensile strength shows no significant increases for higher relative moles of the dextrose relative to the glyoxal crosslinking agent.

The concentration of the carbohydrate in the binder composition may range from about 50 wt. % to about 99 wt. % by dry weight. More specific carbohydrate concentration ranges (by dry weight) include about 75 wt. % to about 95 wt. %; about 90 wt. % to about 95 wt. %; among other ranges. Specific exemplary concentrations (by dry weight) for the carbohydrate include about 50 wt. %, about 55 wt. %, about 60 wt. %, about 65 wt. %, about 70 wt. %, about 75 wt. %, about 80 wt. %, about 85 wt. %, about 90 wt. %, about 95 wt. %; and about 99 wt. %.

Exemplary Catalysts

Reactions between the α-carbon-containing crosslinking agent and carbohydrate may be catalyzed by either acid catalysts or base catalysts. While the catalysis mechanism differs for each class of catalyst, the end result for both is to lower the activation barrier for the formation of an α-carbon nucleophile on the crosslinking agent that reacts with a carbonyl carbon on the carbohydrate.

As noted above, forming an α-carbon nucleophile using an acid catalyst usually includes protonating the EWG to facilitate the formation of a carbocation that in turn causes the deprotonation of the α-carbon and formation of a C=C double bond. The C=C bond can act as the α-carbon nucleophile in addition reactions between the crosslinking agent and a carbonyl carbon on a nearby reducing sugar. For example, when the EWG is a double bonded oxygen that forms a carbonyl functional group, the acid catalyst protonates the oxygen atom, which facilitates the formation of a carbocation at the carbonyl carbon that then tautomerizes into an enol group with the α-carbon. The C=C double bond of the enol group acts as the α-carbon nucleophile.

Exemplary acid catalysts may include organic acids (e.g. acetic acid, citric acid, maleic acid, poly acrylic acid). It has been found that a particular preference is given to organic acids which are preferably present in the binder composition at 0.1-1.0 mole per mole of reducing sugar. Within the aforementioned organic acids, citric acid is most preferred. The optimum level of citric acid per reducing sugar was found at 0.1 to 0.5 mole citric acid to reducing sugar. This embodiment further improves the mechanical performance of the cured fibrous composite. Suitable catalysts may also include inorganic acids organically modified inorganic acids such as sulfuric acid; alkyl sulfonic acids (e.g. methyl sulfonic acid, ethyl sulfonic acid, etc.); aryl sulfonic acid (e.g. p-toluene sulfonic acid); sulfamic acid; alkyl sulfamic acids (e.g. methyl sulfamic acid, ethyl sulfamic acid, etc.); phosphoric acid; alkyl phosphonic acids (e.g. methyl phosphonic acid, ethyl phosphonic acid, etc.); aryl phosphonic acids (e.g. p-toluene phosphonic acid); hypophosphorous acid; and nitric acid, among other inorganic acids and organically modified inorganic acids. They may also include acidic salts of the above described acids, including alkali metal salts, alkali earth metal salts, and transition metal salts. Exemplary acid catalysts may further include Lewis acids such as iron chloride ($FeCl_3$) and aluminum chloride ($AlCl_3$), among other Lewis acid catalysts.

Forming an α-carbon nucleophile using a base catalyst usually involves the simple deprotonation of the acidic hydrogen on the α-carbon to form a nucleophilic α-carbanion. The α-carbanion a highly reactive α-carbon nucleophile that reacts with carbonyl carbons on nearby carbohydrate molecules in the binder composition.

Exemplary base catalysts (also called alkaline catalysts) may include alkali metal hydroxides (e.g. sodium hydroxide, potassium hydroxide, etc.) and alkali earth metal hydroxides (e.g. magnesium hydroxide, calcium hydroxide, etc.). They may also include alkaline nitrogen compounds such as ammonia (e.g. ammonium hydroxide) and amines for binder formulations that can tolerate the presence some Maillard-type reactions with the α-carbon nucleophile reactions. In many instances however, nucleophilic amines and ammonium ions will dominate the reaction with the carbonyl carbons of the carbohydrates and effectively turn the cured binder into a Maillard-type binder. If the specification for the final fiber-containing composite calls for limiting or eliminating melanoidins in the cured binder, ammonium and amine compounds should be limited to tertiary amines which lack an acidic proton that can be removed to from an amine nucleophile. Exemplary tertiary amines include trialkyl amines (e.g. triethyl amine, 1,4-diazabicyclo[2.2.2]octane (DABCO)), and trialkoxy amines (e.g. triethanol amine).

Exemplary concentrations of the catalyst (or combination of catalysts) in the binder composition may have a range from about 1 wt. % to about 20 wt. % of the composition. For example, the catalyst concentration may range from about 1%, 2%, 3%, 4%, 5%, 6%, 7%, etc., on the low end, and 10%, 11%, 12%, 13%, 14%, 15%, 16%, 17%, 18%, 19%, or 20 wt. % on the high end. Exemplary catalyst concentrations may include about 5 wt. %, about 7.5 wt. %, about 8 wt. %, about 9 wt. %, about 10 wt. %, and about 15 wt. % among other concentrations. Additional exemplary concentration ranges for the catalyst concentration include about 5 wt. % to about 15 wt. % based on the dry weight of the binder composition.

The pH of the present binder compositions may vary depending upon the types and relative concentrations of the components used. Typically the pH of the present binder compositions range from acidic to alkaline. An exemplary acidic pHs for the binder composition include about 4 or less; about 3 to about 5; among others. An exemplary alkaline pH for the binder composition is about 9 to about 12 (e.g. about 8 to about 10). Additional exemplary pH ranges can span from acidic to alkaline such as about 2 to 9 (e.g. 4 to 8). The pH range of the binder composition may be different when the catalyst is added to the composition. For example, the binder composition may have a pH range of about 2 to about 9 before the catalyst addition and a pH range of about 0 to about 12 after the catalyst addition. In another example, the pH range be about 2 to about 7 before the catalyst addition and about 0 to about 10 after the catalyst addition.

Additional Binder Components

The binder composition may further include one or more additional components such as adhesion prompters, coupling agents, dedusting oils, oxygen scavengers, solvents, emulsifiers, pigments, organic and/or inorganic fillers, flame retardants, anti-migration aids, coalescent aids, wetting agents, biocides, plasticizers, organosilanes, anti-foaming agents, colorants, waxes, suspending agents, anti-oxidants, and secondary crosslinkers, among other components. For example, the binder composition may include a coupling agent, a dedusting oil, and a biocide in addition to the carbohydrate and the crosslinking agent.

In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers.

Specific examples of coupling agents include silanes such as amino-propyl triethoxy silane, glycidoxy propyl triethoxy silane, isocyanate triethoxy silane, mercapto propyl triethoxy silane, vinyl triethoxy silane, acryloxy propyl triethoxy silane, and propyl triethoxy silane, among other silane compounds. When a coupling agent is included in the binder composition, the concentration range is typically about 0.1 wt. % to about 2 wt. % based on the dry weight of the binder composition.

Specific examples of dedusting oils include petroleum-based oils and vegetable oils, among other kinds of oils. When a dedusting oil is included in the binder composition or sprayed on the curing fiber-binder amalgam, the concentration range is typically about 0.1 wt. % to about 2 wt. % based on the dry weight of the binder composition.

Specific examples of biocides include sodium, zinc, and copper salts of pyrithiones, thiozolones, isothiazolones, benzothiazolones, carbamates such as iodopropynyl butylcarbamate (IPBC), biguanidines, and halogenated nitropropanes, among other biocides. When a biocide is included in the binder composition, the concentration range is typically about 0.1 wt. % to about 2 wt. % based on the dry weight of the binder composition.

The binder composition may also contain reactive or non-reactive polymers with various functions. Polysaccharides and carbohydrates such as starch, cellulose and modified cellulose such as HEC can act as viscosity modifiers and/or fillers. Polyvinyl alcohols (PVOH) may function similar to polysaccharides. It has been found that a particular preference is given to starch and/or polyvinyl alcohols being added, because such starch/polyvinyl alcohols, beyond acting as viscosity modifier and/or filler, is further beneficial for the instant binder composition. The level of starch or polyvinyl alcohols may be as much as 40 wt. % of the total mass of resin, more preferentially less than 30 wt. % of the total mass of resin given as dry weight %. Proteins and protein containing compounds such as soy flour may act as reactive and non-reactive modifiers.

In a preferred embodiment of the instant invention, the binder composition further includes starch and organic acids, such as acetic acid, maleic acid, polyacrylic acid or citric acid, which further improves the mechanical performance of the cured fibrous composite. The organic acid is used in addition to any amounts that may be present for use as catalyst. It has been found that a molar ratio of total organic acid, preferably citric acid, to starch in the range from 0.5/2 to 2/0.5, preferably 1/1.5 to 1.5/1, most preferred 1/1, improves the mechanical performance of the cured fibrous composite. The organic acids, such as acetic acid or citric acid, can be premixed with the starch and/or the crosslinking agent in the same or different molar ratios. For example, one can use a ratio of one mole crosslinking agent with 0.5 mol organic acid, such as citric acid, and a ratio of 1-2 mole organic acid, such as citric acid, per mole of starch to cause a final ratio of 1/1 (acid/starch).

Most preferably, the binder composition include (i) carbohydrate in amounts of 40 to 90 wt. %, (ii) crosslinking agent in amounts of 0.1 to 20 wt. %, (iii) organic acid, most preferred citric acid, in amounts of 10 to 40 wt. %, (iv) starch being different from the aforementioned carbohydrate (i) in amounts of 0.1 to 30 wt. % (all percentage refer to dry weight percentage) Level of catalyst is from 1 wt. % to 10 wt. %, more preferentially 3 wt. %-8 wt. % and most preferentially 3 wt. % to 5 wt. %. This most preferred binder composition embodiment includes the specific molar ratios mentioned in the previous paragraph of this specification.

In a further preferred embodiment of the instant invention, the instant inventors found that the amount of crosslinking agent can be reduced or event totally eliminated in case of for carbohydrates being an aldose and/or ketose, in particular for reducing sugars, in case a strong acid is present. Such strong acid causes the formation of an α-carbon having an acidic hydrogen atom within the aldose and/or ketose moiety (see reaction scheme (IVa) crosslinking between the aldose and/or ketose occurs. The strong acids needed in this embodiment are acids having a pKa of 4.0 and lower (pKa=constant for dissociation of the first proton "pKa1"). The strong acids are present at 1% to 10% by mass of aldose and/or ketose, preferably reducing sugars, preferably at 3% to 8% by mass of aldose and/or ketose. Thus, such binder composition include (i) aldose and/or ketose, preferably reducing sugars in amounts of 90 to 99 wt. %, (ii) strong acid having a pKa of 4.0 and lower being present in 1% to 10% by mass of aldose and/or ketose, preferably reducing sugars, preferably present in 3% to 8% by mass of aldose and/or ketose, (iii) crosslinking agent in amounts of 0.0 to 20 wt. %, (iv) organic acid, most preferred citric acid, in amounts of 0.0 to 40 wt. %, preferably 10 to 40 wt. %, (v) starch being different from the aforementioned aldose and/or ketose (i) in amounts of 0.0 to 30 wt. % (all percentage refer to dry weight percentage). To such extent crosslinking agent (iii), organic acid (iv) or starch (v) being added, the amount of aldose and/or ketose (i) is reduced accordingly but remains by at least 50 wt. %, preferably at least 60 wt. %. Binder composition containing no crosslinking agent that is an organic compound comprising a first carbon moiety selected from an aldehyde, a ketone, a nitrile, and a nitro group; and an α-carbon atom directly bonded to the first carbon moiety, wherein the α-carbon atom has at least one acidic hydrogen atom, show a slightly reduced performance in mechanical properties (about 10 to 20% reduction) than those containing such crosslinking agent. However, for less demanding applications or for applications which require exclusively renewable resources, such binder compositions fit as well.

Unless otherwise indicated, the concentrations of the components of the binder composition are a dry weight percentage (prior to curing) that excludes the weight of a binder solvent. In most instances, the present binder compositions are aqueous, and the binder solvent is water. In some exemplary binder compositions, the composition is colorless. The relative concentration of binder solids in the solvent (i.e. total solids) may range from about 5 wt. % to about 75 wt. % based on the total weight of the binder composition. More specific ranges of the total solids include about 5 wt. % to about 50 wt. %; about 10 wt. % to about 70 wt. %; about 10 wt. % to about 40 wt. %, among others. Specific exemplary total solids concentrations based on the weight of the binder composition include about 10 wt. %, about 15 wt. %, about 20 wt. %, about 25 wt. %, about 30 wt. %, about 35 wt. %, about 40 wt. %, about 45 wt. %, about 50 wt. %, about 55 wt. %; about 60 wt. %; about 65 wt. %; about 70 wt. %; and about 75 wt. %, among other concentrations.

As noted above, nitrogen nucleophiles can adversely compete with the present crosslinking agents for addition to the carbonyl carbons on the carbohydrates. In many instances it may be desirable to reduce or eliminate the presence of these nitrogen nucleophiles from the binder compositions, which in turn reduces or eliminates the presence of their reaction products in the cured binder of the fiber-containing composite. Thus, in some examples of the present binder compositions may lack an amine compound. More specifically, the binder composition may lack a primary amine, a secondary amine, a tertiary amine and/or a quaternary amine. In some examples the present binder compositions may lack ammonia. The binder compositions may lack an ammonium [$NH_4^+$] salt, such as an organic ammonium salt and/or an inorganic ammonium salt. In some examples, the binder composition may lack any nitrogen containing compounds. In some examples, the cured binder may lack any Maillard-type reaction products, for example they may lack melanoidins.

Fiber-Containing Binder Composites

The binder compositions may be used to make fiber-containing composites that include woven or non-woven fibers bound together by a cured matrix of the binder. The fibers in the composite may include one or more types of fibers chosen from glass fibers, carbon fibers, mineral fibers, stone wool fibers, and organic polymer fibers, among other kinds for fibers. The fibers may make up about 50 wt. % to about 99.5 wt. % of the fiber-containing composites. Additional exemplary fiber weight ranges include about 90 wt. % to about 99 wt. %; and about 75 wt. % to about 95 wt %. At the conclusion of the curing stage, the cured binder may be a water insoluble, thermoset binder present as a secure coating on the fiber mat at a concentration of approximately 0.5 to 50 percent by weight of the composition, for example the cured binder may be present at concentration of approximately 1 to 10 percent by weight of the composition. Additional exemplary ranges of the cured binder (as a weight percentage of fiber-containing composite) may include at least about 1 wt. %; at least about 2 wt. %; at least about 3 wt. %; at least about 4 wt. %; at least about 5 wt. %; about 1 wt. % to about 25 wt. %; about 3 wt. % to about 25 wt. %; about 3 wt. % to about 15 wt. %; among other ranges. Specific exemplary amounts of the cured binder as a percentage weight of the fiber-containing composite may include about 3 wt. %, about 5 wt. %, about 6 wt. %, about 7 wt. %, about 8 wt. %, about 9 wt. %, about 10 wt. %, about 11 wt. %, about 12 wt. %, about 13 wt. %; about 14 wt. %; about 15 wt. %; about 20 wt. %; and about 25 wt. %, among other amounts. The cured binder may have a tan, brown, or black color. Examples include the cured binder having a pattern made up of two or more different colors.

The fiber-containing composites may take a variety of forms, for example construction materials including piping insulation, duct boards (e.g. air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

The fibers and binder composition, along with the processing conditions, are selected to produce fiber-containing composites with desired physical properties and aging characteristics. For example, when the fiber-containing composite is a thermal insulation batt, the ordinary (i.e. unweathered) parting strength may be at least about 120 g/g (e.g. at least about 150 g/g). An exemplary range for the ordinary parting strength may be about 120 g/g to about 400 g/g. The weathered parting strength may also be at least about 120 g/g (e.g. at least about 150 g/g), where weathered parting strength is measured after fiber-containing composite has been subjected to elevated temperature (e.g. about 120° F. or more) and humidity (e.g. about 95% or more relative humidity) for a period of time (e.g. about 7 days, about 14 days, etc.). An exemplary range for the weathered parting strength may be about 120 g/g to about 400 g/g.

Additional physical properties of the fiber-containing composite may include a density that range of about 5 kg/m$^3$ to about 100 kg/m$^3$. More specific density ranges may include about 5 kg/m$^3$ to about 20 kg/m$^3$; and about 10 kg/m$^3$ to about 80 kg/m$^3$, among other density ranges. Specific exemplary densities of a the fiber-containing composite may include about 5 kg/m$^3$; about 10 kg/m$^3$; about 15 kg/m$^3$; about 20 kg/m$^3$; about 25 kg/m$^3$; about 30 kg/m$^3$; about 35 kg/m$^3$; about 40 kg/m$^3$; about 45 kg/m$^3$; about 50 kg/m$^3$; about 55 kg/m$^3$; about 60 kg/m$^3$; about 65 kg/m$^3$; about 70 kg/m$^3$; about 75 kg/m$^3$; and about 80 kg/m$^3$, among other densities. Densities for the fiber-containing composite may vary depending on the type of composite made. For example, when the fiber-containing composite is a thermal insulation batt, a density range of about 4 kg/m$^3$ to about 12 kg/m$^3$ is common, although not the only density range. When the fiber-containing composite is duct board, a density range of about 30 kg/m$^3$ to about 100 kg/m$^3$ is more typical, although again not the only density range.

The fiber-containing composite may have a thermal conductivity, $\lambda$, of less than 0.05 W/mK. An exemplary range of the thermal conductivity for the fiber-containing composite may include about 0.02 W/mK to about 0.05 W/mK.

Fiber-containing composites that are thermal insulation batts may have an ordinary (i.e. unweathered) rigidity, as measured by droop level, of about 3 inches or less (e.g. 2.5 inches or less). They may have a weathered droop level of about 5 inches or less (e.g. about 3.5 inches or less). The composites may also have an ordinary recovery level after compression of about 6 inches or more (e.g. 6.5 inches or more). They may have a weathered recovery level of about 5 inches or more (e.g. about 6 inches or more). The droop levels and recovery level ranges may vary depending on the type of fiber-containing composite. For example, a fiber-containing composite that is duct board may have an ordinary recovery level of about 0.9 inches to about 1.1 inches (although this is not the only range of thickness recovery for duct board).

The fiber-containing composites may be made to limit the amount of volatile organic compounds (VOCs) emitted from the composites. Exemplary levels of VOC emissions from the fiber-containing composites may be about 1 lb/hour or less (e.g. about 0.8 lb/hour or less).

As noted above, the fibers in the fiber-containing composite may make up about 50 wt. % to about 99.5 wt. % of the fiber-containing composites, with most of the remaining weight of the composite being the cured binder. Because the cured binder will burn off the composite when it is exposed to intense heat and flame, the loss of weight on ignition of the composite (LOI) may range from about 0.5 wt. % to about 50 wt. %. Additional LOI ranges may be from about 1 wt. % to about 10 wt. %; about 2 wt. % to about 10 wt. %; and about 3 wt. % to about 6 wt. %, among other LOI ranges. LOIs for the fiber-containing composite may vary depending on the type of composite made. For example, when the fiber-containing composite is a thermal insulation batt, an exemplary LOI range may be about 1 wt. % to about 10 wt. % (although this is not the exclusive range). When the fiber-containing composite is duct board, a typically LOI range may been about 15 wt. % to about 22 wt. % (although again this is not the exclusive range).

The fiber-containing composites are water resistant. Exemplary levels of water absorption in the composites may be about 0.5 wt. % or less, based on the weight of the fiber-containing composite. The fiber-containing composites may also generate reduced levels of particles during transport and installation. For example, when the fiber-containing composite is thermal insulation batt, it may generate dust levels of about 10 grams to about 50 grams per 10,000 ft$^2$ of the composite. When the fiber-containing composite is duct board, it may generate dust levels of about 0.03 grams to about 3 grams per pound of the duct board.

Figure 1B:
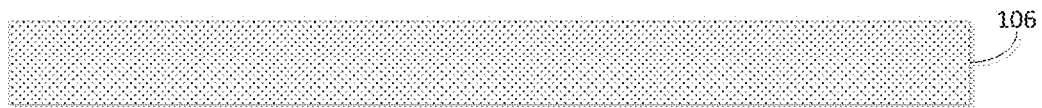
Figure 1C:
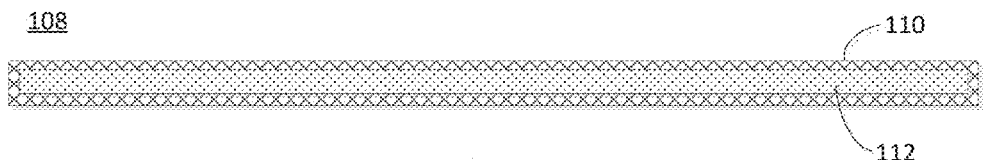

FIG. 1A-C illustrate some of these exemplary composite materials. FIG. 1A is a simplified schematic of an exemplary fiber-containing batt material 102 that may be used for building insulation. The material 102 may include a batt 103 of non-woven fibers held together by the binder. The fibers may be glass fibers used to make fiberglass insulation (e.g., low-density or high-density fiberglass insulation), or a blend of two or more types of fibers, such as a blend of glass fibers and organic polymer fibers, among other types of fibers. In some examples, a facer 104 may be attached to one or more surfaces of the batt 103. Exemplary thicknesses of the batt 103 may range from about 1 cm to about 40 cm (e.g. about 2 cm to about 30 cm).

FIG. 1B is a simplified schematic of an exemplary fiber-containing composite board 106 that may be used as an insulation board, duct board, elevated temperature board, etc. The fibers in board 106 may include glass fibers, organic polymer fibers, carbon fibers, mineral fibers, metal fibers, among other types of fibers, and blends of two or more types of fibers.

FIG. 1C is a simplified schematic of an exemplary fiber-containing flexible insulation material 108 that may be used as a wrap and/or liner for ducts, pipes, tanks, equipment, etc. The fiber-containing flexible insulation material 108 may include a facer 110 attached to one or more surfaces of the fiber material 112. Exemplary materials for the facer 110 may include fire-resistant foil-scrim-kraft facing.

Specific examples of fiber-containing composites that use the present binder compositions include thermal, thermoset insulation batts, such as low-density fiberglass insulation batt (e.g. less than about 0.5 lbs/ft$^3$) and high-density fiberglass insulation batt. Additional examples include piping insulation, duct boards, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation rolls, exterior foundation insulation board, and marine hull insulation.

As noted above in the discussion of the binder composition, the present fiber-containing composites may be free of melanoidin compounds initiated by the reaction of a carbohydrate reducing sugar with a nitrogen nucleophile. In some instances, the fiber-containing binder may be free of any nitrogen-compounds when no nitrogen-containing compounds are added from the binder composition.

Making the Fiber-Containing Binder Composites

The present binder compositions may be used in methods of binding fibers to make the fiber-containing composites. The fiber-containing composites may include fibers of one or more types, such as glass fibers, mineral fibers (e.g. stone wool), carbon fibers, and organic polymer fibers, among other types of fibers. The binder compositions used to make the composites may include a reducing sugar and a glyoxal compound as described above. The methods may include the step of applying the binder composition to a mat of woven or non-woven fibers to make a curable binder-fiber amalgam. The curable amalgam is then cured to form the fiber-containing composite of fibers bound together by the cured binder.

The step of applying the binder composition to the fibers may be done by a variety of techniques including spraying, spin-curtain coating, curtain coating, and dipping-roll coating. The composition can be applied to freshly-formed fibers, or to fibers that have been cooled and processed (e.g. cut, coated, sized, etc.). The binder may be provided to the applicator as a premixed composition or may be supplied to the applicator in separate solutions for the crosslinking agent and the reducing sugar component. In some instances where the binder composition includes a solvent, a portion or all of the solvent may be removed from the composition before or after its application on the fibers.

The step of curing the binder composition may include exposing the composition applied to the fibers to an environment conducive to curing. For example, the curable amalgam of fibers and binder composition may be heated to a binder curing temperature. Exemplary binder curing temperatures may include temperature ranges from about 100° C. to about 250° C.; about 120° C. to about 160° C.; and about 120° C. to about 140° C., among other temperature ranges. Specific exemplary curing temperatures may include about 110° C.; about 120° C.; about 130° C.; about 140° C.; and about 150° C.; among other temperatures. The curing amalgam may be heated to the curing temperature for a period of about 1 minute to about 100 minutes (e.g. about 1 minute to about 20 minutes; about 1 minute to about 15 minutes, etc.).

The curing step may produce the finished fiber-containing composite, such as fiberglass insulation. In some exemplary methods, additional agents like an anti-dusting agent may be applied during or following the curing step.

Figure 2:
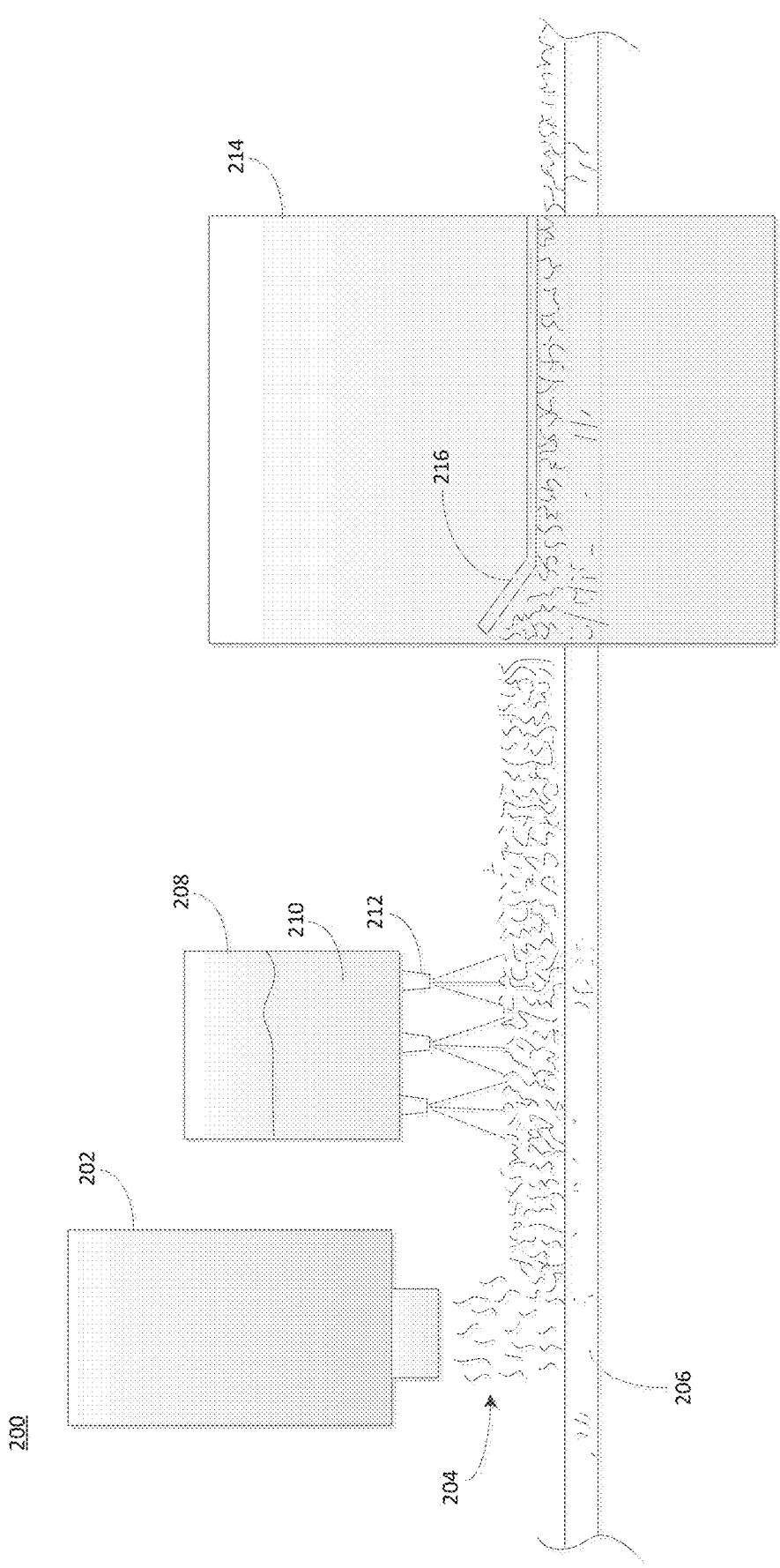
FIG. 2 depicts a simplified schematic of an exemplary fabrication system for making the fiber-containing composites according to embodiments of the invention.

FIG. 2 shows a simplified schematic of an exemplary fabrication system 200 for making the fiber-containing composites described above. The system 200 includes fiber supply unit 202 that supplies the fibers for the composite. The fiber supply unit 202 may be filled with pre-made fibers, or may include equipment for making the fibers from starting materials such as molten glass or organic polymers. The fiber supply unit 202 deposits the fibers 204 onto a porous conveyor belt 206 that transports the fibers under the binder supply unit 208.

The binder supply unit 208 contains a liquid uncured binder composition 210, that is deposited onto the fibers 204. In the embodiment shown, the binder composition 210 is spray coated onto the fibers 204 with spray nozzles 212, however, other application techniques (e.g. curtain coating, dip coating, knife coating, etc.) may be used in addition to (or in lieu of) the spray coating technique illustrated by nozzles 212.

The binder composition 210 applied on fibers 204 forms a fiber and binder amalgam on the top surface of the conveyor belt 206. The belt 206 may be perforated and/or porous to allow excess binder composition 210 to pass through the belt 206 to a collection unit (not shown) below. The collection unit may include filters and circulation pumps to recycle at least a portion of the excess binder back to the binder supply unit 208.

The conveyor belt 206 transports the amalgam to an oven 214 where it is heated to a curing temperature and the binder composition starts to cure. The temperature of the oven 214 and the speed of the conveyor belt 206 can be adjusted to control the curing time and temperature of the amalgam. In some instances, process conditions may set to completely cure the amalgam into the fiber-containing composite. In additional instances, process conditions may be set to partially cure the amalgam into a B-staged composite.

The amalgam may also be compressed prior to or during the curing stage. System 200 shows an amalgam being compressed by passing under a plate 216 that tapers downward to decrease the vertical space available to the curing amalgam. The amalgam emerges from under the plate 216 in a compressed state and has less thickness than when it first made contact with the plate. The taper angle formed between the plate 216 and conveyor belt 206 can be adjusted to adjust the level of compression placed on the amalgam. The partially or fully cured composite that emerges from under plate 216 can be used for a variety of applications, including construction materials such as pipe, duct, and/or wall insulation, among other applications.

EXAMPLES

The dogbone test method is performed as follows:

80 g samples of binder composition having a 50 wt. % solids level are mixed with 1000 g of glass beads (Borosilicate glass with average diameter of 1.0 mm) to make uncured composites. An one ounce sample of the uncured composite is spread into dogbone molds and pressed in the mold at a pressure of about 5,000 psi (at room temperature of 23° C.). The dogbone sample is then released from the mold and heated at about 400° F. for about 20 minutes to form cured dogbone composites. The cured dogbone composites are roughly 25 mm wide and 6 mm thick.

Figure 3:
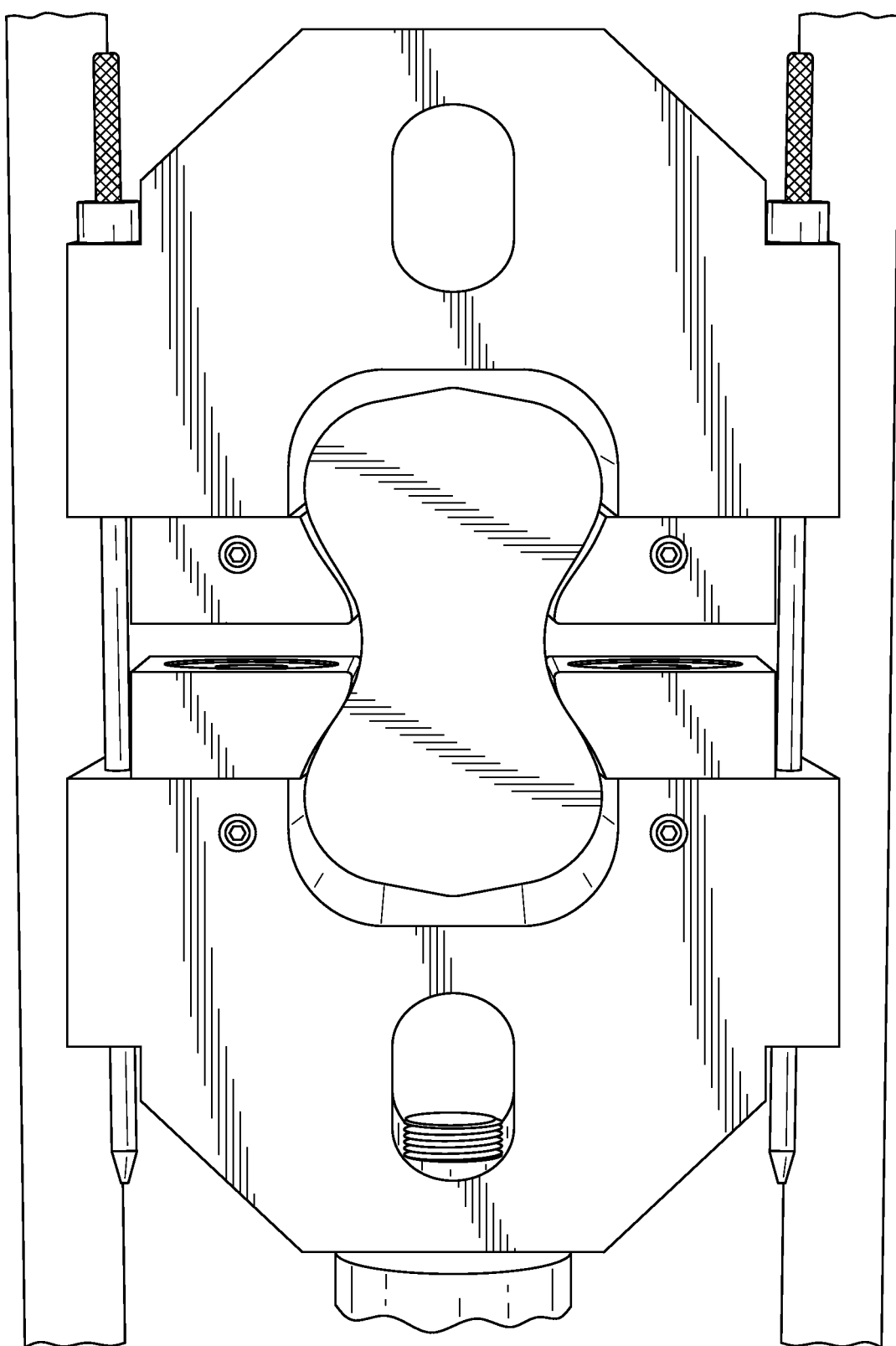
FIG. 3 is a picture of a cured dogbone composite placed in an Instron tensile strength measuring instrument.

The unaged composites are taken directly from the curing oven and placed in an Instron tensile strength testing instrument (Harry W. Dietert Co.—Tensile Core Grip Assembly Part No. 610-7CA) as shown in FIG. 3.

The unaged composites are taken from the curing oven and placed for 24 hours in a humidifying oven set at approximately 95% humidity and 120° F. for ageing. After the aged samples are cooled (to room temperature, 23° C.) for approximately 8 hours, they are placed in the Instron instrument to test their tensile strength.

Example 1A

Tensile Strength Testing of Dextrose/Glyoxal Binder Composites

Comparative tensile strength tests are conducted on composites made with an exemplary dextrose/glyoxal binder composition and control composites made with a dextrose/dihydroxyethyleurea (DHEU) binder composition. The dextrose/glyoxal composition is prepared by mixing 145 g of a 40% solution of glyoxal (58 g active, one mole) with a 50% solution of 900 g dextrose (five moles) in water. This composition is 6% crosslinker and 94% dextrose. The pH of the binder is reduced from 4.5 to 1.0 by addition of small amount of sulfuric acid.

Figure 4:
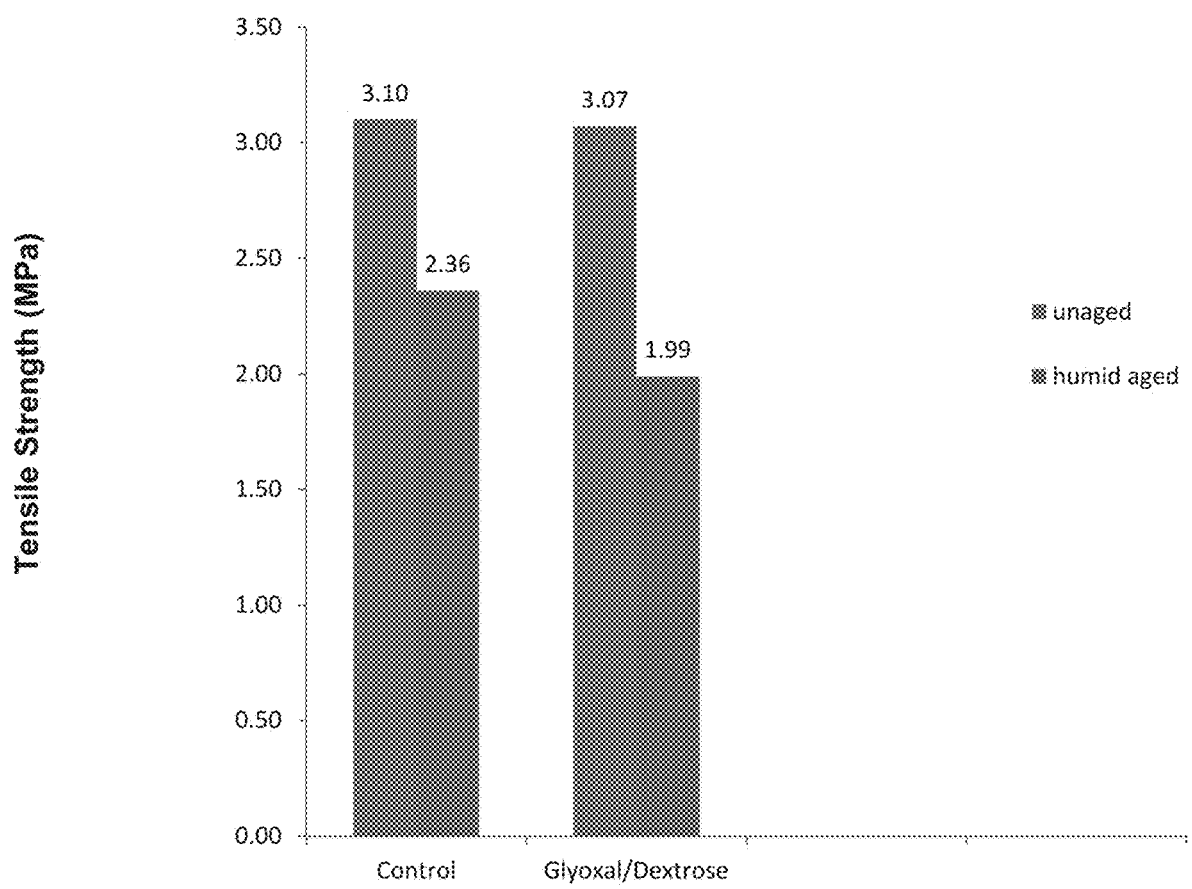
FIG. 4 shows a graph of dogbone tensile strength test results for a cured binder of dihydroxyethyleneurea (DHEU) and dextrose (Control) versus a present cured binder of glyoxal and dextrose (Glyoxal/Dextrose).

FIG. 4 is a graph showing the dogbone tensile strength test results for the dextrose/glyoxal binder under unaged and humid-aged conditions, as well the strength test results for the comparative composite made from the dextrose/DHEU binder. The results demonstrate that the unaged dextrose/glyoxal binder had an almost identical tensile strength as the unaged dextrose/DHEU binder at 3.10 MPa versus 3.07 MPa. When both samples were aged at 120° F. and 95% humidity for 24 hours, the aged dextrose/glyoxal binder showed slightly lower, but still comparable, tensile strength (1.99 MPa) compared with the dextrose/DHEU binder (2.36 MPa). Thus, the mechanical performance of dogbone glass composites made from the dextrose/glyoxal binder composition are comparable to the composites made from the dextrose/DHEU binder composition.

Example 1B

Tensile Strength Testing of HFCS/Glyoxal Binder Composites

Additional tensile strength tests were conducted on composites made with exemplary binder compositions that included combinations of 1521 g of a 71% solution of High Fructose Corn Syrup (HFCS) (1080 g of HFCS, six moles) reacted with 145 g of a 40% solution of glyoxal (one mole) crosslinking agent. A first HFCS/glyoxal binder composition was prepared by by reducing the pH to 1.0 using sulfuric acid and the second binder by increasing the pH with NaOH to 10. Dogbone composites were prepared from both the first and second binder compositions in the same method as described in Example 1A above. The dogbone tensile strength test results demonstrated similar tensile strengths for the control binder (polyacrylic acid) binder compositions as the two glyoxal/HFCS compositions.

Similar results were found by pre-reacting pentane dione (100 g, one mole) with dextrose (1080 g, six moles) as a 50% solution in water at pH of 10. Pentane dione was added to dextrose solution. Next, enough NaOH solution was added to bring the pH from 4.5 to 10. The solution was agitated for one hour at ambient temperature. Mechanical performance of dogbone glass composites was comparable to the commercial polyacrylic acid resin.

The following additional resin formulations were prepared and tested against the control with DHEU:

| Resin | Composition | Mole |
|---|---|---|
| Alpha | HFCS | 4 |
| | Gyoxal | 1 |
| Alpha/CA | HFCS | 4 |
| | Glyoxal | 1 |
| | CA | 0.5 |
| Alpha/CA | HFCS | 4 |
| CA/S | Glyoxal | 1 |
| | CA | 1.5 |
| | Starch | 1 |
| Alpha/CA | HFCS | 4 |
| 2xCA/S | Glyoxal | 1 |
| | CA | 2.5 |
| | Starch | 2 |

HFCS means high fructose corn sirup
CA means citric acid
S means starch, several starches (unmodified and cationic starches) with Mw of 4 to 24 million Dalton unit were tested
Alpha stands for the crosslinking agent (having the "alpha"-carbon atom)

The general procedure for preparing the binder compositions is as follows:

A slurry of starch and dissolved citric acid in water was prepared at ambient temperature (23° C.) at 50 wt. % solids. The slurry was stirred and temperature was increased to 90° C. to dissolve the starch. To this solution at ambient temperature required amounts of Alpha solution (50 wt. % in water) was added and mixed until a uniform solution was formed.

The experiments were repeated with first dissolving starch in water (50 wt. % solids) in the absence of citric acid, followed by addition of the citric acid and Alpha binder. All resin were cured in the presence of 5% sulfuric acid (by dry mass of resin) as catalyst and in the presence of 1% (by dry mass of resin) propyl epoxy tri-ethoxy silane. The experiments were repeated in the presence of 3-amino propyl tri-ethoxy silane. Better results were found in the presence of epoxy silane.

The following Dogbone Composite Data were determined against the control with DHEU/Dextrose at 1:5 moles:e.g.

| Resin | Unaged | Aged | Retention (%) |
|---|---|---|---|
| Control (DHEU/Dextrose) | 3.05 | 2.21 | 72 |
| Alpha | 2.59 | 2.20 | 85 |
| Alpha/CA | 3.35 | 3.18 | 95 |
| Alpha/CA-CA/S | 3.58 | 3.42 | 96 |
| Alpha/CA/2xCA/S | 3.49 | 3.21 | 92 |

The above experiments were repeated with resins without glyoxal. In each case, tensile strength of resins was reduced by 10-20%.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a fiber-containing composite, the method comprising:
   providing a plurality of woven or non-woven fibers;
   applying a binder composition to the plurality of woven or non-woven fibers to make a binder-fiber amalgam, wherein the binder composition consists of:
   at least one reducing sugar or a polysaccharide capable of generating at least one reducing sugar in situ when the binder composition is cured;
   5 wt. % to 25 wt. % by dry weight of the binder composition of a crosslinking agent that is an organic compound comprising:
   a first carbon moiety comprising an electron withdrawing group; and
   an α-carbon atom directly bonded to the first carbon moiety, wherein the α-carbon atom has at least one acidic hydrogen atom and wherein the α-carbon atom forms a nucleophile that reacts with a carbonyl carbon on the sugar during curing of the binder composition;
   a catalyst for catalyzing the reaction between the α-carbon atom and the sugar; and
   one or more additional binder components selected from the group consisting of, dedusting oils, pigments, inorganic fillers, colorants, and waxes;
   curing the binder-fiber amalgam to make the fiber-containing composite, wherein the cured binder in the fiber-containing composite has not more than 3 wt. % of melanoidins.

2. The method of claim 1, wherein the first carbon moiety comprising an electron withdrawing group is selected from an aldehyde, a ketone, a nitrile, a nitro group.

3. The method of claim 1, wherein the binder-fiber amalgam is cured at a temperature of about 120° C. to about 150° C.

4. The method of claim 1, wherein the binder-fiber amalgam is cured for about 1 minute to about 15 minutes.

5. The method of claim 1, wherein the step of providing the plurality of woven or non-woven fibers comprises depositing the fibers on a conveyor belt.

6. The method of claim 5, wherein the conveyor belt is porous, and wherein a portion of the binder composition is removed from the binder-fiber amalgam through the conveyor belt.

7. The method of claim 6, wherein the binder composition removed from the binder-fiber amalgam is recycled into the binder composition applied to the plurality of woven or non-woven fibers.

8. The method of claim 1, wherein the step of applying the binder composition to the plurality of woven or non-woven fibers comprises spray coating the binder composition, curtain coating the binder composition, dip coating the binder composition, or knife coating the binder composition.

9. The method of claim 1, wherein the woven or non-woven fibers are glass fibers.

10. The method of claim 1, wherein the one or more reducing sugars include dextrose.

11. The method of claim 1, wherein the crosslinking agent comprises glyoxal.

12. The method of claim 1, wherein the binder composition has a pH from about 4 to about 8.

13. The method of claim 1, wherein the woven or non-woven fibers comprise about 50 wt. % to about 99.5 wt. % of the fiber-containing composite.

14. The method of claim 1, wherein the binder composition lacks ammonia.

15. The method of claim 1, wherein the fiber-containing composite lacks melanoidins.

16. The method of claim 1, wherein the fiber-containing composite is chosen from duct boards, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts, insulation rolls, heavy density batt insulation, light density batt insulation, exterior foundation insulation board, and marine hull insulation.

17. A method of making a fiber-containing composite, the method comprising:
providing a plurality of woven or non-woven fibers;
applying a binder composition to the plurality of woven or non-woven fibers to make a binder-fiber amalgam, wherein the binder composition consists of:
a reducing sugar or a polysaccharide capable of generating at least one reducing sugar in situ when the binder composition is cured;
5 wt. % to 25 wt. % by dry weight of the binder composition of a crosslinking agent comprising:
a first carbon moiety selected from an aldehyde and a ketone; and
an α-carbon atom directly bonded to the first carbon moiety, wherein the α-carbon atom has at least one acidic hydrogen atom and wherein the α-carbon atom forms a nucleophile that reacts with a carbonyl carbon on the sugar during curing of the binder composition;
a catalyst for catalyzing the reaction between the a-carbon atom and the sugar; and
one or more additional binder components selected from the group consisting of, dedusting oils, pigments, inorganic fillers, colorants, and waxes;
curing the binder-fiber amalgam to make the fiber-containing composite, wherein the cured binder in the fiber-containing composite has not more than 3 wt. % of melanoidins.

18. The method of claim 17, wherein the reducing sugar comprises dextrose.

19. The method of claim 17, wherein the reducing sugar comprises high-fructose corn syrup.

20. The method of claim 17, wherein the first crosslinking agent comprises an aldehyde.

21. The method of claim 20, wherein the aldehyde comprises glyoxal.

22. The method of claim 17, wherein the binder composition lacks ammonia.

23. The method of claim 17, wherein the binder composition lacks a nitrogen-containing compound.

24. The method of claim 17, wherein the catalyst comprises at least one acid having a pKa of 4.0 or less, wherein the acid is present in the binder composition at 1 wt. % to 10 wt. % of the reducing sugar.

25. The method of claim 24, wherein the acid comprises an inorganic acid.

26. The method of claim 25, wherein the inorganic acid comprises sulfuric acid.

27. The method of claim 17, wherein the cured binder has not more than 1 wt. % of melanoidins.

28. The method of claim 17, wherein the cured binder does not contain any amount of melanoidins.

29. The method of claim 17, wherein the binder composition lacks an inorganic ammonium salt.

30. The method of claim 1, wherein the cured binder has not more than 1 wt % of melanoidins.

31. The method of claim 1, wherein the cured binder composition lacks an inorganic ammonium salt.

* * * * *